United States Patent [19]

Wilcox et al.

[11] Patent Number: 5,492,870

[45] Date of Patent: Feb. 20, 1996

[54] HOLLOW CERAMIC MICROSPHERES BY SOL-GEL DEHYDRATION WITH IMPROVED CONTROL OVER SIZE AND MORPHOLOGY

[75] Inventors: David L. Wilcox, Champaign; Jay G. Liu, Urbana, both of Ill.; Jee-Loon Look, Oak Ridge, Tenn.

[73] Assignee: The Board of Trustees of the University of Illinois, Urbana, Ill.

[21] Appl. No.: 227,367

[22] Filed: Apr. 13, 1994

[51] Int. Cl.⁶ .................................................. C04B 38/00
[52] U.S. Cl. ........................... 501/80; 501/12; 501/33; 501/81; 428/402; 428/402.2; 106/409; 264/4.1; 264/4.6
[58] Field of Search ..................... 501/12, 80, 81, 501/84, 33; 106/409; 428/402, 402.2; 264/4.1, 4.6

[56] References Cited

U.S. PATENT DOCUMENTS 4,349,456  9/1994  Sowman ..................... 428/402

5,077,241  12/1991  Moh et al. ..................... 501/80

Primary Examiner—Mark L. Bell
Assistant Examiner—Michael Marcheschi
Attorney, Agent, or Firm—Townsend and Townsend and Crew

[57] ABSTRACT

Hollow microspheres of ceramic material are formed by a sol-gel technique involving forming and stabilizing an emulsion of an aqueous sol of the ceramic material in an organic phase, followed by dehydration of the stabilized emulsion droplets by extraction using a water-absorbing organic liquid, to form hollow gelled spheres, and finally recovery, drying and calcination of the spheres to the final product. The separation of the emulsion formation and dehydration steps into two distinct stages results in the ultimate formation of microspheres with improved uniformity and size distribution.

25 Claims, 6 Drawing Sheets

HOLLOW CERAMIC MICROSPHERES BY SOL-GEL DEHYDRATION WITH IMPROVED CONTROL OVER SIZE AND MORPHOLOGY

BACKGROUND OF THE INVENTION

1. Field of the Invention

The field of technology addressed by this invention is that of hollow ceramic microspheres. These microspheres are useful as lightweight fillers in composites, as fillers for reflective and luminescent coatings, and for thermal insulation and catalyst support applications. Further uses are for the encapsulation of nuclear fusion materials for inertial confinement fusion, for the fabrication of low dielectric constant materials by the introduction of controlled porosity, and for the manufacture of substrates for high-performance multi-chip modules in the microelectronic packaging industry. In particular, this invention relates to methods for the manufacture of microspheres for these and other uses.

2. Description of the Prior Art

One manufacturing method in current commercial use is disclosed by Beck, W.R., et al. U.S. Pat. No. 3,365,315 (Jan. 23, 1968). According to this method, glass particles containing a blowing agent are blown into shells in a gas flame. A second method involves the formation of atomized droplets or powders formed by gelation or spray drying, and the feeding of these droplets through a vertical shell blowing furnace where the water vapor entrapped in the droplets creates internal cavities. This method and variations on it are disclosed by Hendricks, C.D., et al., *J. Nucl. Mater.* 85/86:107 (1979); Veatch, F., et al. U.S. Pat. No. 3,030,215 (Apr. 17, 1962), Netting, D.I., U.S. Pat. Nos. 3,794,503 (Feb. 26, 1974), 3,796,777 (Mar. 12, 1974), and 3,888,957 (Jun. 10, 1975); and Walsh, R.J., U.S. Pat. No. 3,161,468 (Dec. 15, 1964). Hollow microspheres produced by these methods are, in most cases, limited to glass compositions and are typically hundreds of microns in diameter.

Other methods in the literature which are effective in forming smaller microspheres include: a dual-nozzle hollow drop generation technique as described by Kim, K.K., et al., *J. Am. Ceram. Soc.* 74(8):1987 (1991); a spray pyrolysis method as described by Jada, S.S., *J. Mater. Sci. Lett.* 9(5):565 (1990), and Gadalla, M., et al., *J. Mater. Res.* 5(12):2923 (1990); an emulsion evaporation technique as described by Sarikaya, Y., et al., *Ceramic International* 14:239 (1988); and a water extraction sol-gel technique as described by Sowman, H.G., U.S. Pat. No. 4,349,456 (Sep. 14, 1982).

The Sowman technique involves the dispersion of an aqueous sol of the microsphere wall material, i.e., the ceramic precursor, in a dehydrating liquid such as a lower alkyl alcohol. The dehydrating agent causes the ceramic precursor to concentrate at the periphery of each droplet in the dispersion, thereby forming a defined spherical shell of gelled ceramic material, with a void at the center of the cell which is filled with a mixture of the dehydrating liquid and water. The liquid is then evaporated from the spherical shells, and the shells are calcined to harden the ceramic and convert the shells to hollow ceramic microspheres.

An advantage of this technique is that it provides chemically homogeneous microspheres and can be used to form microspheres of a wide range of single or multicomponent ceramic compositions. A disadvantage of the technique is that the microspheres which it produces are of a broad size distribution and the process offers little control over particle morphology. These and other disadvantages of the Sowman process and the prior art in general are addressed by the present invention.

SUMMARY OF THE INVENTION

It has now been discovered that microspheres can be made by a water extraction sol-gel technique in such a manner that control of microsphere morphology is improved and a narrower size distribution is obtained. In accordance with this discovery, an emulsion step is introduced into the manufacturing process prior to and separately from the dehydration. The emulsion is formed by dispersing the aqueous sol in an organic liquid which does not cause dehydration of the droplets, to form a water-in-oil type emulsion, and the emulsion is stabilized to a selected droplet size. Dehydration is then performed on the emulsion droplets by introducing a second organic liquid which has the characteristics of the dehydrating agents of the prior art. This converts the aqueous droplets to liquid-filled gelled microcapsules, as in the prior art, the microcapsules capable of being subsequently converted to dry ceramic microspheres. The dehydrating agent remains effective despite the continued presence of the non-dehydrating organic continuous phase, and the intervention of the latter enables one to manipulate and control system parameters which were not previously available or accessible for control, to achieve microspheres with more closely specified characteristics. The process of this invention thereby retains the beneficial features of the prior art sol-gel technique and eliminates its disadvantages.

Parameters which are newly available for control by the introduction of the emulsion step include the volume ratio of the continuous phase to the dispersed phase, the colloid concentration in the dispersed phase, the type and degree of shear force imposed on the emulsion to control the droplet size, the use of additives in the emulsion to stabilize the droplets, and the volume ratio of the emulsion to the dehydrating liquid. These parameters may be controlled in conjunction with other parameters of the system to achieve hollow microspheres with an improved degree of control over such features as size, wall thickness, and other characteristics of the microspheres.

These and other features and advantages of the invention will be apparent from the description which follows.

DETAILED DESCRIPTION OF THE INVENTION AND PREFERRED EMBODIMENTS

Figure 1:
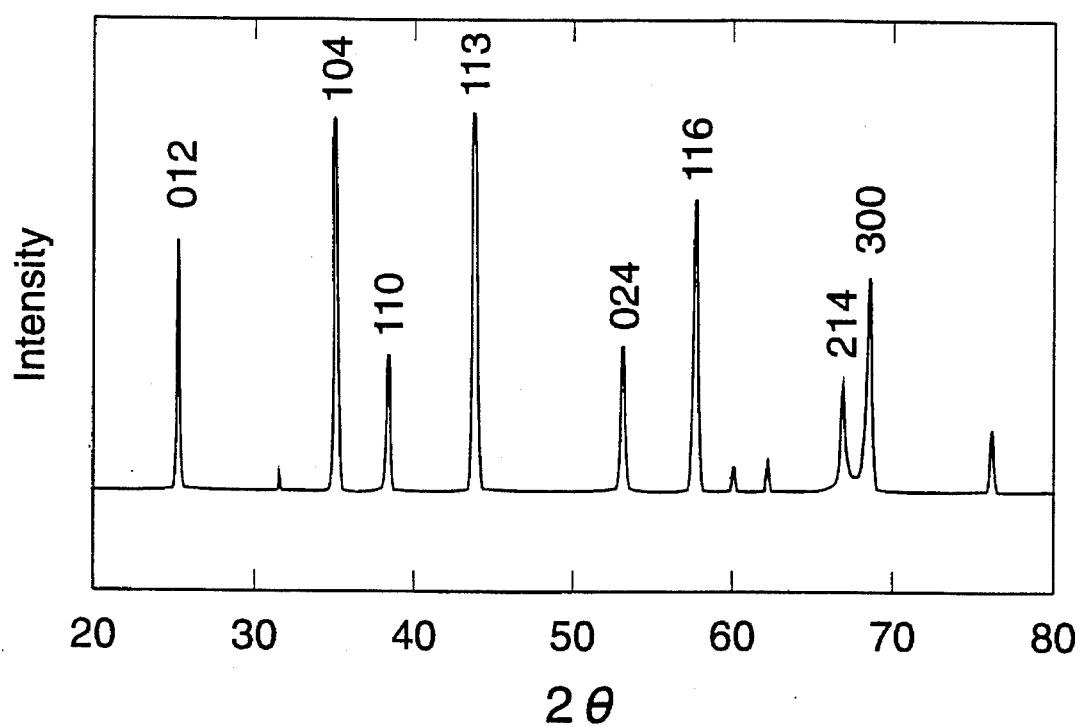
FIG. 1 is a x-ray diffraction pattern of hollow alumina microspheres prepared in accordance with this invention.

The term "aqueous sol" is used herein to include both homogeneous aqueous solutions, aqueous colloid solutions, and finely divided aqueous suspensions of either ceramic materials or precursors to ceramic materials which can be converted to ceramic materials by methods conventional to ceramics processing, such as calcining.

The term "ceramic materials" is used herein to include those materials conventionally known as ceramics plus others of similar characteristics, and generally refers to materials which can be converted by calcination to a rigid, polycrystalline form. Included among these are metal oxides, metal hydroxides, and certain nonmetallic oxides having an atomic number of 14 or greater. Examples of metal oxides are $TiO_2$, $Cr_2O_3$, $WO_3$, $ThO_2$, $Fe_2O_3$, $MgO$, $Y_2O_3$, $ZrO_2$, $HFO_2$, $V_2O_5$, $Nb_2O_5$, $UO_2BeO$, $CoO$, $NiO$, $CuO$, $ZnO$, $In_2O_3$, $Sb_2O_3$, $Al_2O_3$, $SnO_2$, and mixtures thereof, such as $ZnO\text{-}TiO_2$, $TiO_2\text{-}Fe_2O_3$, $SnO_2\text{-}TiO_2$, $Nd_2O_3\text{-}TiO_2$, $Al_2O_3\text{-}Cr_2O_3$, $MgO\text{-}Al_2O_3$, $MgO\text{-}TiO_2$, $MgO\text{-}ZrO_2$, $ThO_2\text{-}UO_2$, $ThO_2\text{-}CeO_2$, $Bi_2O_3\text{-}TiO_2$, $BeO\text{-}Al_2O_3$, $TiO_2\text{-}Fe_2O_3\text{-}Al_2O_3$, $Al_2O_3\text{-}Cr_2O_3\text{-}Fe_2O_3$, $PbO\text{-}Zro_2\text{-}TiO_2$, $ZnO\text{-}Al_2O_3\text{-}Cr_2O_3$, $Al_2O_3\text{-}Cr_2O_3\text{-}Fe_2O_3\text{-}TiO_2$, and $ThO_2\text{-}Al_2O_3\text{-}Cr_2O_3\text{-}Fe_2O_3\text{-}TiO_2$. Examples of nonmetal oxides are $SiO_2$, $As_2O_3$, and $P_2O_5$. Preferred ceramic materials are oxides and hydroxides of aluminum, silicon, titanium, chromium, magnesium, yttrium, zirconium, thorium, uranium, plutonium, iron, tin, zinc, and combinations thereof. Oxides and hydroxides of aluminum, silicon and combinations thereof are particularly preferred.

Various metal oxides in the above list are commercially available in the form of aqueous sols or dry powders which are readily dispersed in water to form sols. For example, alumina, chromic oxide and ferric oxide sols are sold under the trademark NALCO®(Nalco Chemical Co., Naperville, Ill., USA). Silica sols are sold under the trademarks NALCO®, LUDOX®(E.I. DuPont de Nemours & Co., Inc., Wilmington, Del., USA), SYTON®(Monsanto Company, St. Louis, Mo., USA), and NYACOL®(PQ Corp., Valley Forge, Pa., USA). Colloidal alumina powder is sold under the trademark DISPAL®(Vista Chemical Co., Houston, Tex., USA).

Precursors to ceramic materials include such compounds as acetates, formates, oxalates, lactates, propylates, citrates, and acetylacetonates, as well as salts of mineral acids, such as chlorides, bromides, chlorates, nitrates, suffates, and phosphates. Examples are ferric chloride, ferric nitrate, chromium chloride, cobalt nitrate, nickel chloride, copper nitrate, zinc chloride, zinc carbonate, lithium propylate, sodium carbonate, sodium oxalate, potassium chloride, beryllium chloride, magnesium acetate, calcium lactate, strontium nitrate, barium acetate, yttrium bromide, zirconium acetate, hafnium oxychloride, vanadium chloride, ammonium tungstate, aluminum chloride, indium iodide, titanium acetylacetonate, stannic sulfate, lead formate, antimony chloride, bismuth nitrate, neodymium chloride, phosphoric acid, cerium nitrate, uranium nitrate, and thorium nitrate.

The concentration (i.e., dissolved or suspended solids content) of the aqueous sol is not strictly critical and may vary, although it will affect the size and wall thickness of the microspheres ultimately formed. In the dehydration step, which is discussed in detail below, the emulsion droplets containing uniformly dissolved or dispersed solids are transformed into gelled liquid-filled spheres, and this transformation entails shrinkage of the droplets. When the concentration within the starting droplet is low, a greater degree of shrinkage occurs, and the ultimate microspheres are smaller and denser as a result. In fact, with a concentration sufficiently low, the shrinkage may be so great that the ultimate microspheres are solid rather than hollow. At very high concentrations, on the other hand, the droplet will shrink to a much lesser degree but will have thick walls. The ratio of the external radius of the microsphere to the wall thickness is termed the "aspect ratio." In most applications of the invention, best results are obtained when the aspect ratio ranges from about 2 to about 10. For microspheres having aspect ratios within this range and external diameters of about 1 to about 50 microns, aqueous sols having a concentration of about 5% to about 30% by weight are preferred.

The concentration of the sol can also be characterized in terms of the ratio of its initial concentration $C_0$ to the critical concentration $C_c$. The critical concentration is the concentration at which the sol begins to gel. This ratio is referred to herein as the "relative colloid concentration." In preferred methods according to this invention, the relative colloid concentration is greater than 0.05, and in most preferred methods, it is from about 0.2 to about 0.5.

Peptizing agents are frequently useful to stabilize the sols. For alumina and silica sols, for example, a useful peptizing agent is nitric acid. The type of peptizing agent most suitable for a particular suspension and its most appropriate amount will be readily apparent to those skilled in the art.

The continuous phase used in the formation of the emulsion may be any organic liquid which is chemically inert with respect to other components in the system and has substantially no tendency to dissolve water from the aqueous sol. This includes organic solvents which are immiscible with water, as well as those which are partially miscible with water but are saturated with water prior to use. Included among these are aromatics, heterocyclic compounds, aliphatics, both saturated and unsaturated, ethers, ketones, organic acids and acid anhydrides, alcohols, aldehydes and esters, all of which can be either unsubstituted or substituted with any of a variety of common substituents, such as alkyl groups, hydroxyl groups, amino groups, halogen atoms, and nitro groups. Aromatics, alcohols, ketones and esters are preferred. Specific examples are toluene, 3-methyl-1-butanol and 2-ethyl-1-hexanol. Of the alcohols, saturated $C_5$–$C_9$ alkyl alcohols are particularly preferred.

The volume ratio of the aqueous sol to the organic liquid serving as the continuous phase is not strictly critical and may vary. As the proportion of aqueous sol to organic liquid decreases, the droplets tend to decrease in size. Droplet size affects the morphology of the microsphere ultimately formed by the process, and for droplets below a certain size, the wall thickness of the microsphere will increase relative to the microsphere diameter, thereby forming denser microspheres to the point where the microspheres are no longer hollow. The "aspect ratio" referred to above is thus affected by this variable as well. Clearly, if the proportion of aqueous sol to organic liquid is too high, the droplets will have a tendency to coalesce, interfering with the formation of discrete microspheres. With these considerations in mind, the proportion which is most effective in achieving microspheres of desired dimensions from any particular starting material is readily determinable by routine experimentation. In most cases, best results are obtained when the volume ratio of the aqueous sol to the organic liquid used as the continuous phase is from about 1:1.5 to about 1:10, preferred ratios being within the range of about 1:4 to about 1:7.5.

Emulsifying agents are often useful in stabilizing the emulsion. Any of the wide range of known emulsifying agents may be used. These include, but are not limited to, polyalkoxycarboxylates, N-acylsarcosinates, acylated protein hydrolysates, alkylbenzene-sulfonates, alkylarenesulfonates, lignosulfonates, naphthalenesulfonates, α-olefinsulfonates, petroleum sulfonates, dialkylsulfosuccinates, amidosulfonates, alcohol sulfates, ethoxylated alkyl sulfates, ethoxylated alkylphenol sulfates, phosphate esters, alcohol ethoxylates, alkylphenol ethoxylates, carboxylic acid esters, glycerol esters, polyoxyethylene esters, anhydrosorbitol esters, diethanolamine condensates, monoalkanolamine condensates, polyoxyethylene fatty acid amides, amine oxides, alkyl amine ethoxylates, ethylenediamine alkoxylates, and quarternary ammonium salts. Examples of commercially available emulsifying agents are those sold by BASF AG (Ludwigshafen, Germany) under the trademarks DYNIT®, LUTENSOL®, and WETTOL®, those sold by BASF Corp. (Parsippany, N.J., USA) under the trademarks ICONOL®, KLEARFAC®, PLURAFAC®, PLURAFLO®, and PLURONIC®, those sold by Harcros Chemicals Inc. (Kansas City, Kans., USA) under the trademarks T-DET® and T-MULZ®, those sold by W.R. Grace & Co. (Lexington, Mass., USA) under the trademark DAXAD®, those sold by Henkel Corp. (Ambler, Pa., USA) under the trademarks AGRIMUL®, EMEREST®, EMSORB®, HYONIC®, MONOLAN® and TRYCOL®, those sold by ICI Americas Inc. (Wilmington, Del., USA) under the trademarks ATLOX®, ATPHOS®, ATPLUS®, ATSURF®, BRIJ®, MYRJ®, RENEX®, SPAN® and TWEEN®, those sold by Rhone-Poulenc, Inc. (Monmouth Junction, N.J., USA) under the trademark GAFAC®, those sold by Stepan Co. (Northfield, Ill., USA) under the trademark TOXIMUL®, and those sold by Witco Corp. (New York, N.Y., USA) under the trademarks ARMIX®, ARMUL®, FLO-MO® and SPONTO®.

The amount of emulsifying agent used will vary depending on the needs of the system, and will generally be at the discretion of the user, to whom the most appropriate amount for any particular emulsion composition will be readily apparent. In most cases, best results will be obtained with amounts ranging from about 0.1 to about 20 g per liter of organic phase, with about 1 to about 10 g per liter preferred.

Control of the emulsion droplet size may be achieved by conventional means, such as applying shear forces in a controlled manner. A conventional laboratory or industrial scale blender can be used for this purpose. The higher the stirring speed, the smaller the average size of the ultimately formed microspheres, and the smaller the size distribution. Stirring speeds ranging from about 300 rpm to about 10,000 rpm, for example, can be used.

Once the emulsion is stabilized to the desired droplet size, the emulsion is added to the dehydrating liquid. In general, the dehydrating liquid will be one which is miscible with the organic liquid serving as the continuous phase, and preferably fully miscible at the amounts used. The dehydrating liquid will also be one which is miscible with water, but only to a limited extent. Preferred dehydrating agents are organic liquids which, prior to use, contain water at a level below the saturation point. More preferred are those which are substantially anhydrous (i.e., containing no more than trace amounts of water, and most preferably no water at all) and have a water solubility (i.e., the saturation point or the maximum amount of water that can be dissolved) of from about 5% to about 50% by weight. Further preferred dehydrating liquids are those having water solubilities of from about 10% to about 35% by weight.

Useful dehydrating liquids can be drawn from the same types of compounds listed above for the continuous phase of the emulsion. Preferred among these are alkyl alcohols, ketones, amines and esters. Examples are n-butanol, sec-butanol, 2-methyl-1-propanol, 1-pentanol, 2-pentanol, 3-methyl-2-butanol, 2-methyl-2-butanol, 3-methyl-3-pentanol, 2-methyl-2-pentanol, 2,3-dimethyl-2-butanol, cyclohexanol, methyl ethyl ketone, methyl isobutyl ketone, dipropylamine, methyl acetate, and ethyl acetate. These liquids can be used alone or in any of various combinations. Particularly preferred dehydrating agents are $C_4$–$C_6$ alkyl alcohols. Among these, the most preferred are sec-butanol and n-butanol.

The choice of dehydrating agent is an important factor in determining the rate at which the water leaves the droplet. This rate is termed the "water extraction rate", and will steadily decrease as dehydration proceeds. The initial value of the water extraction rate is inversely related to the "dehydrating agent saturation percent," which is the percentage ratio of the amount of water in the system to the theoretical amount of water that the dehydrating agent in the system can dissolve prior to becoming saturated. If the initial water extraction rate is sufficiently high (and the dehydrating agent saturation percent therefore sufficiently low), water will be removed from the droplet at a rate faster than that at which the colloidal particles can diffuse within the droplet. The result of this difference in rates is the initial accumulation or concentration of dissolved or suspended ceramic material near the surface of the droplet as water near the surface leaves the droplet and the concentration of the dissolved or suspended material at the droplet periphery reaches the critical concentration $C_c$ and gels. The gellation at the periphery provides a skin on which further material deposits, thereby initiating the transformation of the droplets into hollow liquid-filled gelled spheres. Conversely, if the initial water extraction rate is too low (and the dehydrating agent saturation percent too high), either a solid continuous (rather than hollow) microsphere is formed or gellation does not occur at all. The dehydrating agent saturation percent is also dependent upon the relative amounts of the liquids used, since for a given dehydrating agent, the percent will be lower with a higher proportion of dehydrating agent. For best results, the dehydrating agent and its amount relative to the other components of the system will be selected to achieve a dehydrating agent saturation percent ranging from about 1% to about 75%, and preferably from about 5% to about 30%.

Note that the dehydrating liquid and the organic liquid serving as the continuous phase in the formation of the emulsion may be the same organic solvent with limited water miscibility. When used in the emulsion step, the solvent will be presaturated with water, whereas when used in the dehydrating step, the solvent will be either undersaturated or anhydrous. It is preferred, however, to use two distinct organic solvents, the one used in the emulsion step being of lower water solubility than the one used in the dehydrating step.

As suggested above in the discussion of the dehydrating agent saturation percent, the separation of the emulsion formation and droplet dehydration stages into two distinct steps in the process of the invention introduces as a further variable the volume ratio of the emulsion to the dehydrating agent. There is considerable room for variation of this ratio within the scope and practice of the invention, and it is generally not a critical parameter. In most implementations of the invention, however, this ratio will range from about 1:1.5 to about 1:10, and preferably from about 1:3 to about 1:6.

The characteristics of the process of the invention and the microspheres formed by it can be expressed by certain relationships among the system parameters. It may be assumed, for example, that the mass of ceramic material in the initial droplet, in the droplet at the onset of gellation, and in the final microcapsule are equal. A relation between the geometry of the microcapsule and the sol or colloid concentration can then be derived as follows:

$$\frac{4}{3}\pi r_0^3 C_0 = \int_0^{r_0} 4\pi r^2 C(r,t_c) dr = \frac{4}{3}\pi(r_1^3 - r_2^3)C_c \quad (1)$$

In this equation:

$r_0$ is the initial droplet radius;

$r_1$ and $r_2$ are the external and internal radii of the final microcapsule, respectively;

$C_0$ is the initial colloid concentration;

$C_c$ is the critical concentration at which the sol starts to gel; and $C(r, t_c)$ is the concentration distribution of colloidal particles at time $t_c$ when the concentration near the surface reaches the critical value $C_c$.

An expression for $C(r, t_c)$ can be derived by using the assumption that Fick's diffusion equation takes the form of an exponential expression or error function. The expression thus derived is as follows:

$$C(r,t_c) = \frac{(C_c - C_0)}{erf\left(\frac{r_1}{K}\right)} erf\left(\frac{r - r_1}{K}\right) + C_c \quad (2)$$

In this expression, $$K = 2\sqrt{D_w t_c}$$

where $D_w$ is the diffusivity of water in alcohol and $t_c$ is as defined above, i.e., the time required before the initial membrane begins to form.

The higher the water extraction rate, the lesser the amount of time required before the membrane begins to form and the lower the value of K. Since the diffusivity $D_w$ is of secondary influence in this relation, K is dominated by $t_c$ and therefore reflects the water extraction rate. The significance of these relations will be demonstrated in the Examples below.

Using the model represented by Equations (1) and (2), one can predict that the initial formation of the skin on the droplet surface, which represents the initiation of the dehydration, would occur within in a few hundredths of a second after the dispersion of the emulsion in the dehydrating liquid, and that dehydration (i.e., diffusion of the colloidal particles toward the skin) would be complete within a few seconds.

The processing steps described above can be performed under ambient conditions such as temperatures within or close to the range of 20° C. to 40° C., although these conditions are not critical, and may be varied while still achieving the desired results. Other conditions, such as pressure and relative humidity, may likewise be varied, although normal ambient conditions such as those commonly encountered in the laboratory or indoors manufacturing facility may be used as the most convenient.

Once formed, the gelled hollow microcapsules filled with the liquid dehydrating agent are separated and recovered from the continuous liquid phase by conventional means, such as filtration, decantation or centrifugation. This is followed by washing with a suitable organic liquid such as acetone to ensure against agglomeration. The gelled microcapsules are then dried to remove residual external liquids. Drying may be performed in air or by any conventional means which does not cause any transformation in the microcapsule morphology or composition. Drying in this manner will generally be continued long enough to evaporate the internal liquid as well, leaving hollow, air-filled gel spheres.

Calcination is then performed to convert the dried gel spheres to rigid hollow ceramic spheres. Preferably, calcination is performed under conditions sufficient to convert the ceramic material to a crystalline form. This is generally achieved by heating the spheres at a temperature gradually rising to the transition temperature for the particular ceramic material, then maintaining the spheres at the transition temperature for a sufficient period of time for a full transition to take place. The heating rates and final temperatures will vary depending on the ceramic material used, and will be readily apparent to those skilled in the ceramics art. In most applications, the heating rate will be from about 50° C. per hour to about 500° C. per hour, and the final temperature will range from about 500° C. to about 1500° C. The final temperature will be maintained for at least about thirty minutes and often an hour or more.

The following examples are offered by way of illustration and not by way of limitation.

EXAMPLES

Materials and Methods

A. Colloid Materials

Commercial boehmite powder (CATAPAL®D, Vista Chemical Co., Houston, Tex., USA) having particles in the range of 50–150 nm served as the source of alumina. An aqueous alumina sol was prepared by dispersing the boehmite in deionized water peptized by concentrated nitric acid. The resulting alumina sol had a pH of approximately 2.

A purchased colloidal silica sol (LUDOX®LS, Du Pont Chemical Co., Wilmington, Del., USA) having a BET surface area of 220 $m^2/g$, a total silica content of 30% by weight, an average particle diameter of 12 nm, and a pH value of 8.1 was used as the source of silica.

A mullite precursor was prepared by adding nitric acid to the colloidal silica sol to lower the pH below the isoelectric point of silica (which is about 2), then mixing the silica sol with the alumina sol to give an $Al_2O_3:SiO_2$ mole ratio of 3:2.

The concentrations of each of these precursors were adjusted to achieve relative colloid concentrations ($C_0/C_c$) within the desired range. The critical concentrations $C_c$ were estimated by testing sols at various concentrations and rapidly heating them to see if gellation occurred as the water evaporated.

B. Emulsion Preparation

Emulsions were prepared by dispersing the colloidal sols in an organic liquid phase with a suffactant. The dispersions were sheared by a high-speed Waring blender (Model BHL 120, Wafing Products Div., Dynamics Corp. of America, New Hartford, Conn., USA) using a 1000-mL stainless steel blender cup to form the colloidal sol into droplets. Blender speeds of 1200 to 2200 rpm were used. Liquids used as the organic liquid phase were water-saturated n-butanol, water-saturated 2-ethyl-1-hexanol and toluene, all producing similar results in terms of forming a stable emulsion. The surfactant used was SPAN®80 (ICI Americas, Inc., Wilmington, Del., USA), a fatty acid partial ester of sorbitol anhydride with a hydrophilic-lipophilic balance number of 4.3. The amount used was 0.4 g per 100 mL of organic liquid.

In a typical procedure for ultimately preparing 2 g of metal oxide microspheres, approximately 20 mL of the colloidal sol was added with stirring to 100 mL of the organic liquid containing 0.4 g of the surfactant. Stirring was continued for 2 minutes, and the resulting turbid droplet suspension was transferred to the dehydrating liquid for the subsequent steps of the process.

C. Extraction of Water

The typical procedure for extracting water from the emulsion droplets consisted of stirring 200 to 300 mL of dry organic liquid in a 1000-mL blender cup at a speed of 1200 rpm and adding the sol droplet suspension at an amount selected to give the desired proportion. Stirring was continued for one minute and the resulting mixture was filtered through a No. 42 Whatman filter paper in a Buchner funnel with the aid of a vacuum aspirated flask, followed by washing with acetone. The filter cake of gelled microcapsules was recovered and dried in a glass petri dish at ambient temperature for about ten hours to remove the liquid within the microcapsules. The microcapsules were then converted to crystalline hollow microspheres by calcination at a heating rate of 200° C. per hour to the crystalline temperature, where they were held for two hours.

D. Microsphere Characterization

The size distribution of the crystalline hollow microspheres was determined by a light scattering particle size analyzer (MICROTRAC®II, Leeds & Northrup, North Wales, Pa., USA). Surface and fracture surface morphologies of the microspheres were examined by both optical microscope and scanning electron microscope (Model ISI DS-130, International Scientific Instruments, Inc., Bloomfield, N.J., USA). The dehydration behavior of the gelled microspheres during calcination was studied using a Du Pont Model 51 thermal gravimetric analyzer. Powder x-ray diffraction patterns were obtained with a Rigaku DMAX-II diffractometer (Rigaku-USA, Danvers, Mass., USA) using CuKα radiation and a scanning rate of 2° 2θ/min.

EXAMPLE 1

This example illustrates the formation of hollow microspheres of alumina. The spheres were prepared by the procedure described above, with the following particulars:

(i) Sol composition: 10% $Al_2O_3$ by weight (source: commercial boehmite, as indicated above), peptized with concentrated $HNO_3$.

(ii) Emulsion formation: 20 g of sol dispersed in 100 mL of water-saturated
2-ethyl-1-hexanol+0.4 g SPAN®80 surfactant, sheared in a Waring Blender at 1600 rpm for 2 minutes.

(iii) Extraction of water: about 120 mL of emulsion transferred to 300 mL of n-butanol, and stirred in a Waring Blender at 1200 rpm for one minute, vacuum filtered as described above, and calcined in air as described above to the crystalline temperature of 1150 ° C.

The procedure resulted in 2 g of microspheres. Scanning electron micrographs and powder x-ray diffraction patterns were taken of the microspheres. The spheres were then fractured by placing the hollow microspheres between two glass slides and applying manual force, and scanning electron micrographs were again taken. The x-ray diffraction patterns are shown in FIG. 1.

The micrographs and x-ray diffraction patterns showed that the spheres were fully crystalline alumina in the form of hollow non-porous spheres. The external diameters of the spheres ranged from 1 to 30 microns, and the aspect ratios ranged from 1.5 to 5.

EXAMPLE 2

This example illustrates the formation of hollow microspheres of silica. The procedure described above was again used, with the following particulars:

(i) Sol composition: 15% $SiO_2$ by weight (source: LUDOX®LS, diluted).

(ii) Emulsion formation: 20 g of sol dispersed in 100 mL of water-saturated 2-ethyl-1-hexanol+0.4 g SPAN®80 surfactant, sheared in a Waring Blender at 1600 rpm for 2 minutes.

(iii) Extraction of water: about 120 mL of emulsion transferred to 300 mL of n-butanol, and stirred in a Waring Blender at 1200 rpm for one minute, vacuum filtered as described above, and calcined in air as described above to the crystalline temperature of 950° C.

Figure 2:
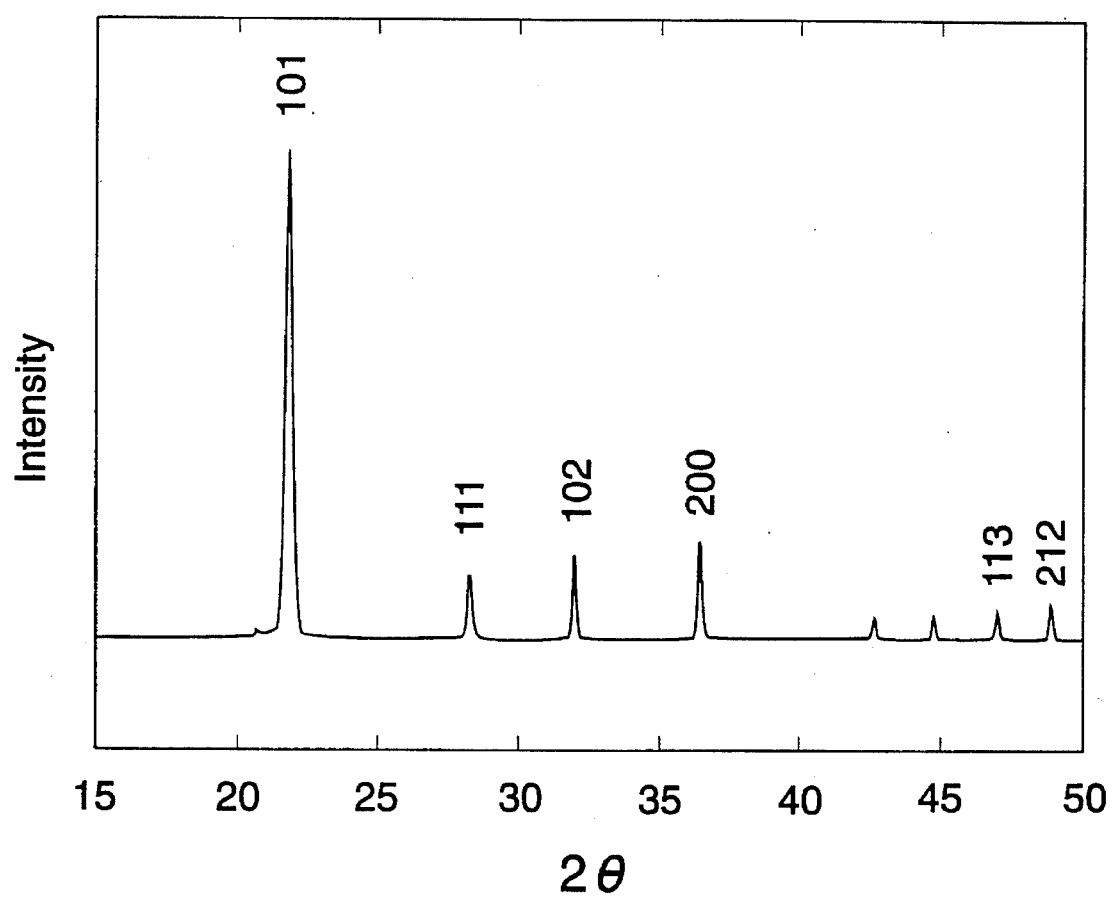
FIG. 2 is a x-ray diffraction pattern of hollow silica microspheres prepared in accordance with this invention.

The procedure resulted in 3 g of microspheres. Scanning electron micrographs and powder x-ray diffraction patterns were taken as in Example 1. The x-ray diffraction patterns are shown in FIG. 2.

The micrographs and x-ray diffraction patterns showed that the spheres were hollow non-porous spheres of fully crystalline silica. The external diameters of the spheres ranged from 1 to 30 microns, and the aspect ratios ranged from 3 to 10.

EXAMPLE 3

In this example, the formation of hollow microspheres of mullite is illustrated. The procedure described above was again used, with the following particulars:

(i) Sol composition: 10% $Al_2O_3$ by weight (as in Example 1) and 15% $SiO_2$ by weight (as in Example 2, except with pH reduced to less than 2 by adding 2M $HNO_3$), the two sols being combined in a weight ratio of 3.8:1 to achieve $3Al_2O_3 \cdot 2SiO_2$, the stoichiometric ratio of mullite.

(ii) Emulsion formation: 18 g of sol dispersed in 100 mL of water-saturated 2-ethyl-1-hexanol+0.4 g SPAN®80 surfactant, sheared in a Waring Blender at 1600 rpm for 2 minutes.

(iii) Extraction of water: about 120 mL of emulsion transferred to 300 mL of n-butanol, and stirred in a Waring Blender at 1200 rpm for one minute, vacuum filtered as described above, and calcined in air as described above to the crystalline temperature of 1300 ° C.

Figure 3:
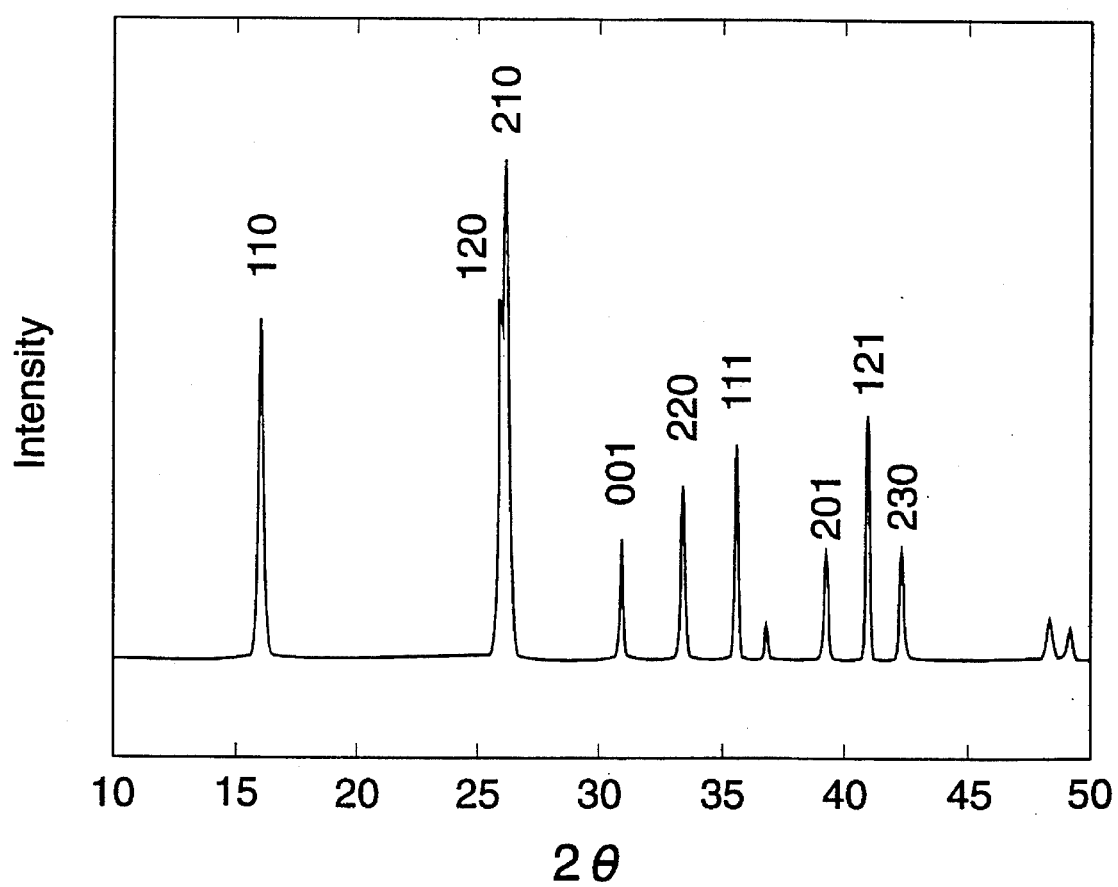
FIG. 3 is a x-ray diffraction pattern of hollow mullite microspheres prepared in accordance with this invention.

The procedure resulted in 2 g of microspheres. Scanning electron micrographs and powder x-ray diffraction patterns were taken as in Examples 1 and 2. The x-ray diffraction patterns are shown in FIG. 3.

The micrographs and x-ray diffraction patterns showed that the spheres were hollow non-porous spheres of fully crystalline mullite, with external diameters ranging from 1 to 30 microns, and aspect ratios ranging from 2 to 8.

EXAMPLE 4

This example involves the preparation of silica microspheres, and illustrates the influence of the silica content of the colloid on the microsphere size and aspect ratio.

Silica microspheres were prepared using the procedure described in Example 2, except that sols with four different levels of silica were used—30%, 15%, 10% and 5% by weight, corresponding to relative colloid concentrations ($C_0C_c$) of 0.45, 0.22, 0.15 and 0.07, respectively. Scanning electron micrographs were taken, and the following observations were made by visual estimation:

TABLE I

Variation of Microsphere Size
With Relative Colloid Concentration

| Relative Colloid Concentration | Average Microsphere Size (approximate) (microns) | Microsphere Size Range (approximate) (microns) |
|---|---|---|
| 0.45 | 20 | 2–50 |
| 0.22 | 11 | 1–30 |
| 0.15 | 7 | 1–20 |
| 0.07 | 3.5 | 0.5–10 |

These data indicate that the microsphere size decreases with decreasing colloid concentration.

Figure 4:
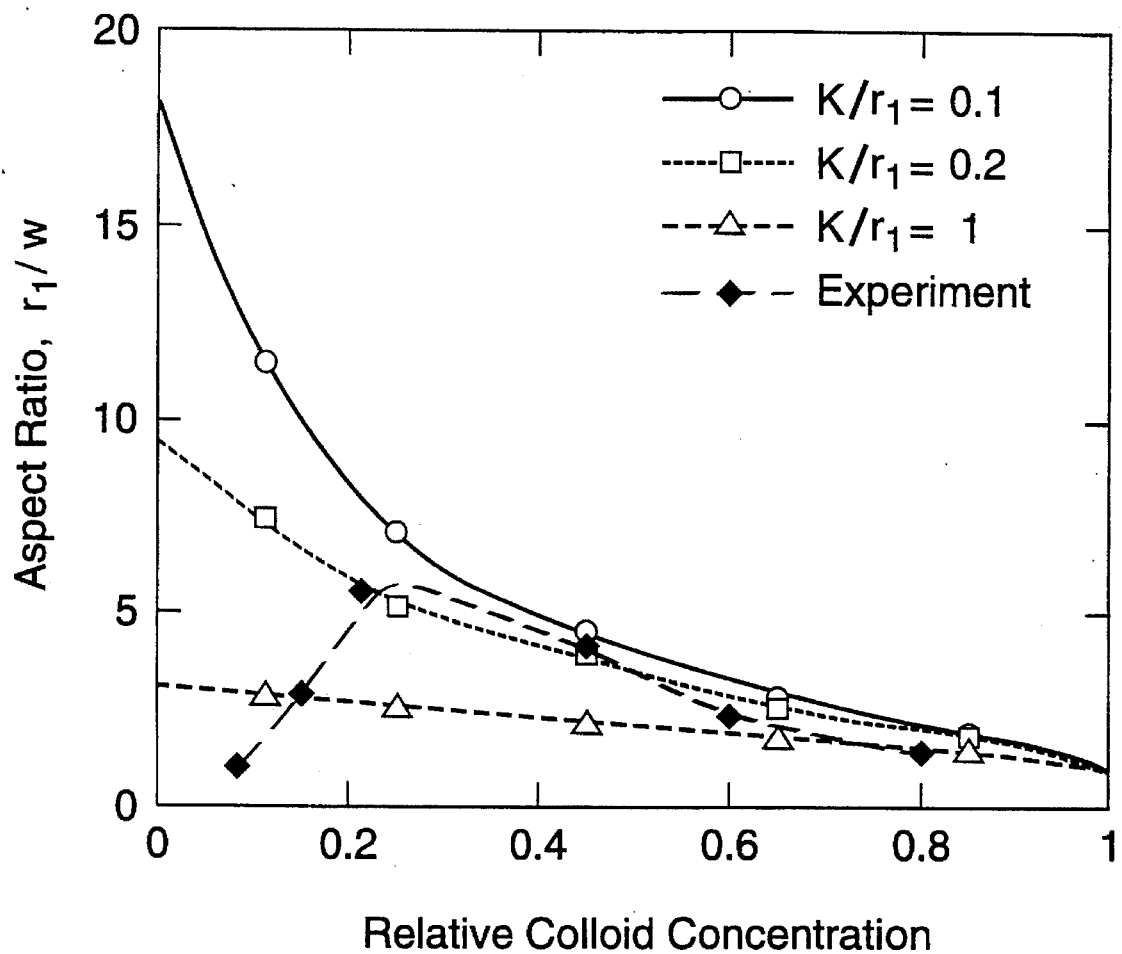
FIG. 4 is a plot of the aspect ratio (a measure of the wall thickness relative to the microsphere diameter) of silica microspheres prepared in accordance with this invention vs. relative colloid concentration, shown in comparison with theoretical values.

Average aspect ratios ($r_1/w$, where $w=r_1-r_2$) were determined by measurements of the cross sections and wall thickness using transmission type optical microscopy and by examining the fractured surfaces using scanning electron microscopy. The average aspect ratios are plotted against the relative colloid concentration in FIG. 4, where they are represented by filled diamonds. Also shown in the plot are aspect ratios calculated from Equations (1) and (2) above for three values of the ratio $K/r_1$—open circles: $K/r_1=0.1$; open squares: $K/r_1=0.2$; and open triangles: $K/r_1=1$. The experimental data closely follows the curve of $K/r_1=0.2$ except at relative colloid concentrations of less than 0.2, where an opposite trend is observed.

As stated above in the discussion of Equations (1) and (2), these equations would lead one to predict that the skin on the droplet surface, which represents the initiation of the dehydration, would form within in a few hundredths of a second after the dispersion of the emulsion in the dehydrating liquid, and that dehydration would be complete within a few seconds. The latter was confirmed by visual observation, which indicated that the spheres were fully formed in well under 2–3 seconds.

EXAMPLE 5

This example involves the preparation of mullite microspheres, illustrating the dependence of microsphere morphology on the water extraction rate as established by the alcohol saturation percent. The variation in water extraction rate was achieved by using different alcohols as the dehydrating agent and by varying the amount of alcohol relative to the amount of water present in the sol.

Mullite microspheres were prepared as described in Example 3, except that the amount of water in the sol and the amount and type of alcohol were as listed in Table II.

TABLE II

Variation of Aspect Ratio With Alcohol Saturation Percent

| Sample | Water in Sol (ML) | Dehydrating Alcohol (mL) | Alcohol Saturation Percent[a] | Water Extraction Rate | Average Aspect Ratio |
|---|---|---|---|---|---|
| 1 | 8 | 2-ethyl-1-hexanol (300) | 133 | very low | 1[b] |
| 2 | 16 | 3-methyl-1-butanol (250) | 80 | low | 1 |
| 3 | 16 | n-butanol (200) | 40 | medium | 3 |
| 4 | 8 | n-butanol (300) | 13 | high | 5 |
| 5 | 8 | sec-butanol (300) | 7 | high | 6 |
| 6 | 8 | 2-propanol (200) | 0 | miscible | 1[c] |

[a] The amount of water present in the sol expressed as a percent of the total water-dissolving capacity of the amount of dehydrating alcohol present.
[b] No gellation occurred.
[c] Non-spherical porous agglomerates were formed.

The data in Table II show that as the alcohol saturation percent drops (and the water extraction rate rises accordingly) the aspect ratio generally rises. At extreme high and low alcohol saturation percents, however, neither hollow nor solid microspheres are formed. In sample 1, the water extraction rate was so low that there was insufficient dehydration ability to gel the droplets. In sample 6, where there was complete miscibility of the alcohol and water and hence no water extraction, non-spherical porous agglomerates were formed.

EXAMPLE 6

This example compares the process of the present invention with the one-step process disclosed by Sowman, U.S. Pat. No. 4,349,456. The comparison is shown in terms of the size distribution.

Figure 5A:
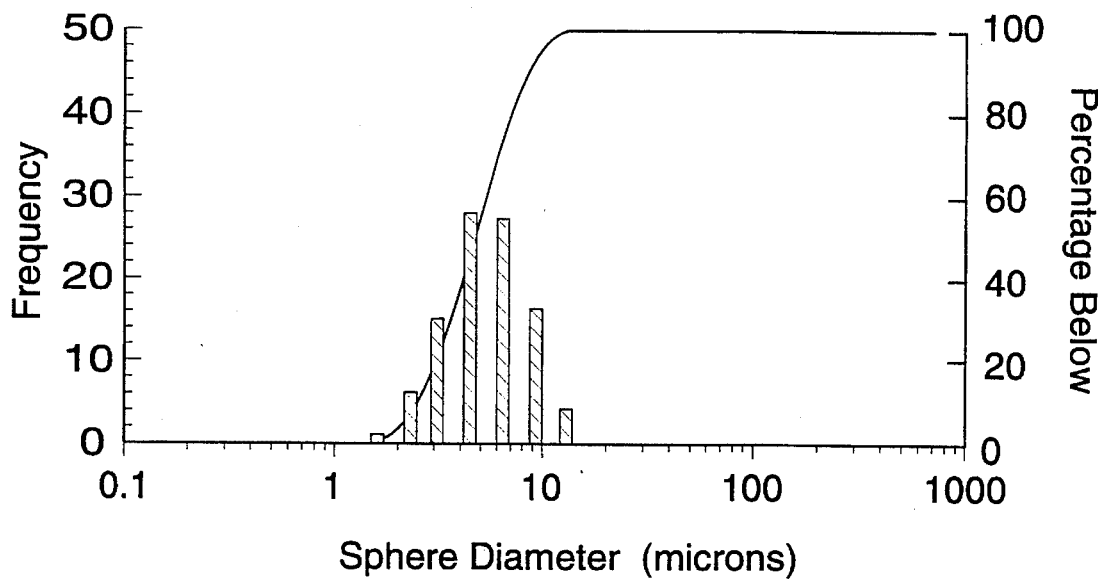
FIGS. 5a and 5b are comparative plots of size distributions of microspheres prepared in accordance with the present invention (FIG. 5a) and in accordance with the one-step process of the prior art (FIG. 5b).
Figure 5B:
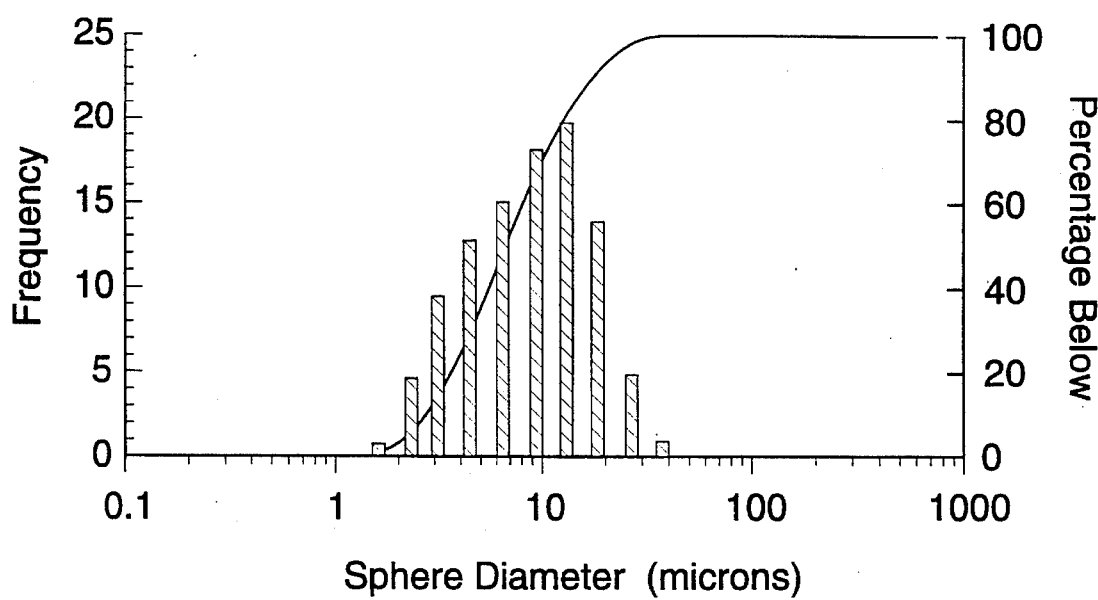

Mullite microspheres were prepared according to the procedure of Example 3 above, except that water-saturated n-butanol was used as the dispersing liquid, while still using dry n-butanol as the dehydrating agent. A parallel preparation, representing the one-step process of the prior art, was also performed without the emulsion step (and hence without the inclusion of the saturated n-butanol or the emulsifying agent), using an amount of dry n-butanol equal to the total of the saturated n-butanol and the dry n-butanol used in the first preparation. Size distribution measurements were taken on each of the two products. The distributions are shown in FIGS. 5a and 5b. The left vertical axis of each plot refers to the bars in the plot, indicating the percentage at size indicated in the horizontal axis. The right vertical axis of each plot refers to the curve and represents the cumulative percent as a function of the size.

Comparison of the two plots shows that the microspheres formed by the process of the invention are smaller, with an average diameter of 5.9 microns (FIG. 5a) vs. an average diameter of 10.6 microns (FIG. 5b) in the microspheres formed by the one-step process. The size distribution is also narrower, with a standard deviation of 2.7 microns (FIG. 5a) vs. 6.8 microns for the microspheres of the two-step process.

EXAMPLE 7

This example demonstrates the influence on the size distribution of varying the shear force exerted on the emulsion. The shear force was varied by varying the blender speed.

Figure 6:
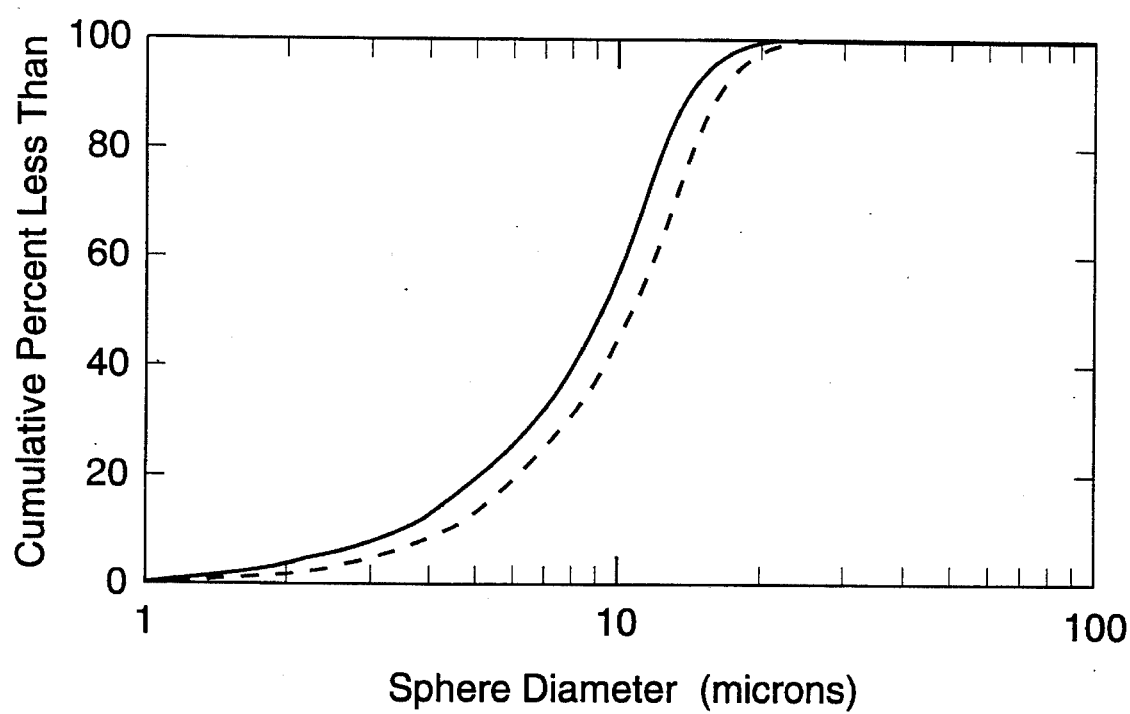
FIG. 6 is a plot of the cumulative size distributions of two batches of microspheres prepared in accordance with the present invention, the two batches differing in the degree of shear force applied to the emulsion before water extraction was performed.

Mullite microspheres were prepared according to the procedure of Example 3, except that one batch was prepared using a blender speed of 1200 rpm and a second batch was prepared using a blender speed of 2200 rpm. Blending was continued for two minutes in each case. Cumulative size distributions were determined on each of the two batches over a range of 0 to 100 microns and the results are shown in FIG. 6, where the dashed line represents microspheres formed from emulsions sheared at 1200 rpm and the solid line represents microspheres formed from emulsions sheared at 2200 rpm.

The two curves clearly show that the higher blender speed (and consequently higher shear force) produced microspheres of a measurably smaller diameter without affecting the size distribution. The average diameter at 2200 rpm was 11.4 microns, while the average diameter at 1200 rpm was 13.5 microns. The two curves strongly suggest that greater variations in the shear force will produce greater differences in the average size of the microspheres.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

What is claimed is:

1. A process for the manufacture of hollow ceramic microspheres, comprising:
   (a) forming an aqueous sol of a member selected from the group consisting of ceramic materials and materials calcinable to ceramic materials;
   (b) dispersing said aqueous sol in a first organic liquid that does not dissolve water from said aqueous sol, to form an emulsion with said aqueous sol as a disperse phase and with a continuous phase that does not extract water from said disperse phase;
   (c) adding said emulsion to a second organic liquid, said second organic liquid being one which dissolves water from said aqueous sol, to convert said emulsion to a suspension of hollow microspheres filled with a mixture of said second organic liquid and water; and
   (d) recovering and calcining said hollow microspheres to remove liquid therefrom and to convert said hollow microspheres to hollow shells of crystalline metal oxide.

2. A process in accordance with claim 1 in which said first organic liquid is an organic liquid having a water solubility of less than about 10% by weight but which is saturated with water prior to step (b).

3. A process in accordance with claim 2 in which said first organic liquid is an organic liquid having a water solubility of less than about 5% by weight.

4. A process in accordance with claim 2 in which said first organic liquid is an alkyl alcohol of at least 5 carbon atoms.

5. A process in accordance with claim 2 in which said first organic liquid is a member selected from the group consisting of alkyl alcohols, ketones, and esters.

6. A process in accordance with claim 2 in which said first organic liquid is a $C_5$–$C_9$ alkyl alcohol.

7. A process in accordance with claim 2 in which said first organic liquid is a member selected from the group consisting of 3-methyl-1-butanol and 2-ethyl-1-hexanol.

8. A process in accordance with claim 2 in which said first organic liquid is 2-ethyl-1-hexanol.

9. A process in accordance with claim 1 in which said said second organic liquid is substantially anhydrous and has a water solubility of from about 5% to about 50% by weight.

10. A process in accordance with claim 9 in which said second organic liquid has a water solubility of from about 10% to about 35% by weight.

11. A process in accordance with claim 9 in which said second organic liquid is a member selected from the group consisting of aromatics, alkyl alcohols, ketones, and esters.

12. A process in accordance with claim 9 in which said second organic liquid is a $C_4$–$C_6$ alkyl alcohol.

13. A process in accordance with claim 9 in which said second organic liquid is a member selected from the group consisting of sec-butanol and n-butanol.

14. A process in accordance with claim 9 in which said second organic liquid is n-butanol.

15. A process in accordance with claim 1 in which step (b) further comprises incorporating an emulsifying agent into said emulsion.

16. A process in accordance with claim 1 in which step (b) further comprises shearing said emulsion in a blender at a shear rate of from about 300 rpm to about 10,000 rpm.

17. A process in accordance with claim 1 in which said aqueous sol of step (a) is a sol of a member selected from the group consisting of oxides and hydroxides of aluminum, silicon, titanium, chromium, magnesium, yttrium, zirconium, thorium, uranium, plutonium, iron, tin, zinc, and combinations thereof.

18. A process in accordance with claim 1 in which said aqueous sol of step (a) is a sol of a member selected from the group consisting of oxides and hydroxides of aluminum, silicon, and combinations thereof.

19. A process in accordance with claim 1 in which said aqueous sol has a dissolved solids content of from about 5% to about 30%.

20. A process in accordance with claim 1 in which the ratio of the concentration of dissolved solids in said aqueous sol to the critical concentration of dissolved solids is greater than 0.05.

21. A process in accordance with claim 1 in which the ratio of the concentration of dissolved solids in said aqueous sol to the critical concentration of dissolved solids is from about 0.2 to about 0.5.

22. A process in accordance with claim 1 in which step (b) comprises dispersing said aqueous sol in said first organic liquid at a volume ratio of from about 1:1.5 to about 1:10.

23. A process in accordance with claim 1 in which step (b) comprises dispersing said aqueous sol in said first organic liquid at a volume ratio of from about 1:4 to about 1:7.5.

24. A process in accordance with claim 1 in which step (c) comprises adding said emulsion to said second organic liquid at a volume ratio of from about 1:1.5 to about 1:10.

25. A process in accordance with claim 1 in which step (c) comprises adding said emulsion to said second organic liquid at a volume ratio of from about 1:3 to about 1:6.

* * * * *